(No Model.) 2 Sheets—Sheet 1.

T. A. B. PUTNAM.
ELECTRIC RAILWAY SIGNAL.

No. 258,600. Patented May 30, 1882.

WITNESSES:
E. B. Bolton
Geo. Bainton

INVENTOR:
Theodore A. B. Putnam,
By his Attorneys,
Burke, Fraser & Connett (No Model.)

2 Sheets—Sheet 2.

T. A. B. PUTNAM.
ELECTRIC RAILWAY SIGNAL.

No. 258,600.

Patented May 30, 1882.

WITNESSES:
E. B. Bolton
Geo. Bainton

INVENTOR:
Theodore A. B. Putnam,
By his Attorneys,
Burke, Fraser & Bonnett

N. PETERS, Photo-Lithographer, Washington, D. C.

UNITED STATES PATENT OFFICE.

THEODORE A. B. PUTNAM, OF NEW YORK, N. Y., ASSIGNOR, BY MESNE ASSIGNMENTS, TO THE RAILWAY CAB ELECTRIC SIGNAL COMPANY, OF SAME PLACE.

ELECTRIC RAILWAY-SIGNAL.

SPECIFICATION forming part of Letters Patent No. 258,600, dated May 30, 1882.

Application filed June 25, 1881. (No model.)

*To all whom it may concern:*

Be it known that I, THEODORE A. B. PUTNAM, a citizen of the United States, residing in the city, county, and State of New York, have invented certain Improvements in Electric Railway-Signals, of which the following is a specification.

This invention is an improvement upon the system of signals embodied in my Patent No. 243,619, dated June 28, 1881, for electric danger-alarms for railways, to which the public is referred for a description of all the features of my system not hereinafter described.

Figure 1:
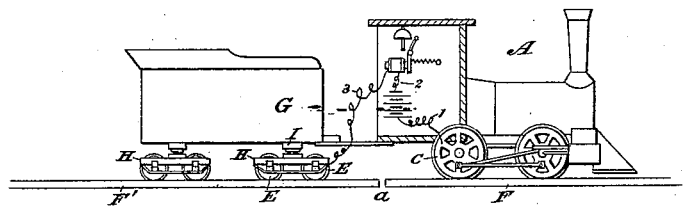
Figure 2:
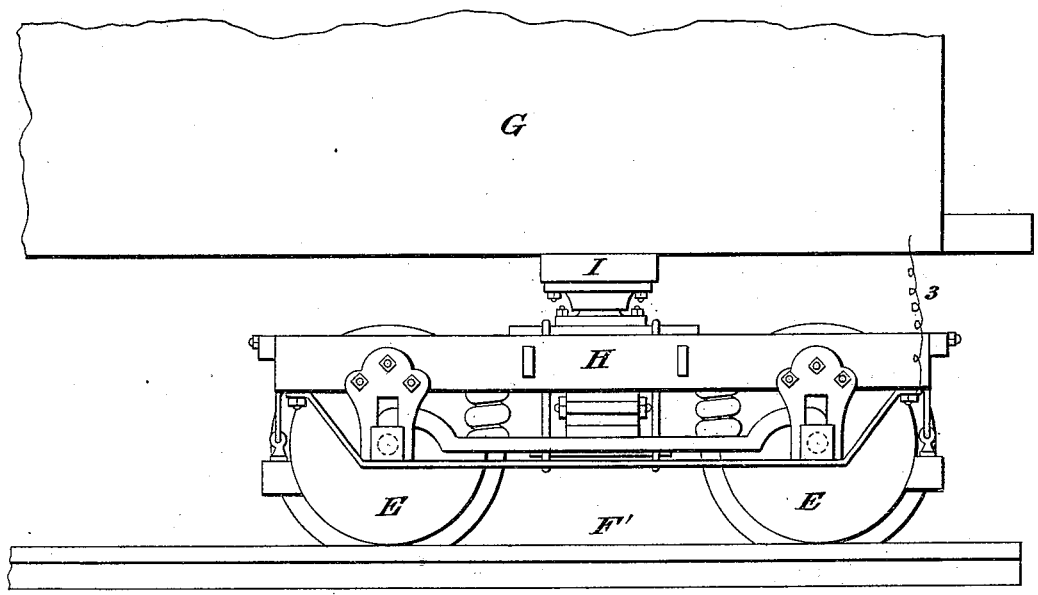
Figure 3:
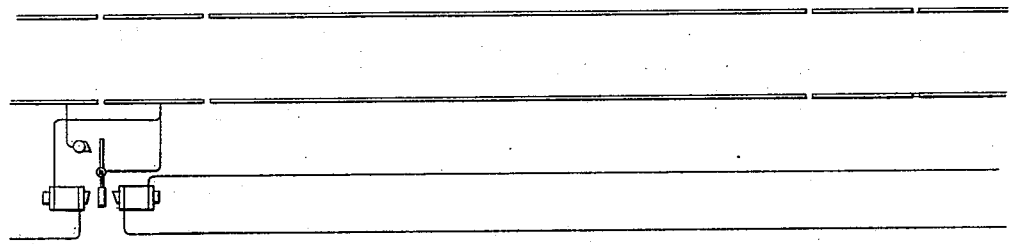

Figure 1 of the accompanying drawings is a side elevation of a locomotive and tender fitted up according to my invention. Fig. 2 is a fragmentary side elevation of the tender on a larger scale, and Fig. 3 is a plan of a portion of the track.

My present invention relates to the method of making connection between the partial circuit on the locomotive and the track. I now dispense with the brush shown in my said patent as one of the terminals of the partial circuit, and utilize in place thereof one of the pairs of wheels of the locomotive or tender, or of some car of the train, care being taken that these wheels are insulated from the wheels of the locomotive which form the opposite terminal.

In Fig. 1 the wheels C of the locomotive are shown as the forward terminal, and the wheels E of the tender are shown as the rear terminal. The wires 1 and 3 of the partial circuit connect with the wheels C and E, respectively, through the medium of their trucks or bearings. The wire 1 may be connected to some metallic part of the locomotive which conducts the current to the bearings of the wheels. The wire 3 is connected likewise to some metallic part of the truck H of the tender, through which the connection is completed with the axle of the wheels E, and the truck H is insulated from the tender, and hence also from the locomotive, by means of the wooden beam I.

In my said patent the brush forming one terminal bears only on one rail of the track—the right-hand rail—and consequently only that rail is interrupted by insulating-spaces. With my present arrangement, however, such insulation of one rail is insufficient, as it is obvious that in crossing such an insulation (as at *a* in Fig. 1) the current would pass through the wheel C to the left-hand rail, and through that rail to the wheel E, thereby preventing the breaking of the locomotive-circuit. I therefore provide both rails of the track with the same insulations as those shown in my said patent for the right-hand rail only, as indicated in Fig. 3. It is not necessary that the wires of the partial track-circuits shown in my said patent shall connect with both insulated rails of the track, it being sufficient to make such connection with one of the rails, as shown in Fig. 3. It will be observed that in Fig. 2 of my said patent both rails of the track are provided with insulated breaks, similar to those shown in Fig. 3 of this application; but only one rail is used by a locomotive running in one direction, the other rail being for connection with locomotives running in the other direction. My present invention has the advantage over my said patent of dispensing with all attachments to the exterior of the locomotive for connection with the rail—such as metal brushes or extra contact-wheels—which are a source of frequent expense for renewal and repairs, and the application of which to some compactly-made locomotives is inconvenient and almost impossible.

I claim as my invention—

A locomotive bearing a partial closed electric circuit, including a generator and alarm, and terminating, on the one hand, in a pair of wheels of the locomotive, and, on the other hand, in a truck or pair of wheels of the locomotive, tender, or some car of the train, said wheels being insulated from those first named, in combination with a railway-track having insulated spaces or breaks in both the right-hand and left-hand rails thereof, the insulations of one rail being opposite those of the other, substantially as set forth.

In witness whereof I have hereunto signed my name in the presence of two subscribing witnesses.

THEODORE A. B. PUTNAM.

Witnesses:
ARTHUR C. FRASER,
HENRY CONNETT.